United States Patent
Kanke

(10) Patent No.: US 7,613,582 B2
(45) Date of Patent: Nov. 3, 2009

(54) THERMAL TYPE FLOW RATE MEASUREMENT APPARATUS

(75) Inventor: Atsushi Kanke, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 40 days.

(21) Appl. No.: 11/667,456

(22) PCT Filed: Nov. 11, 2004

(86) PCT No.: PCT/JP2004/016721

§ 371 (c)(1),
(2), (4) Date: May 10, 2007

(87) PCT Pub. No.: WO2006/051589

PCT Pub. Date: May 18, 2006

(65) Prior Publication Data

US 2008/0092645 A1    Apr. 24, 2008

(51) Int. Cl.
*G06F 19/00* (2006.01)
(52) U.S. Cl. .................................. 702/100; 73/204.11
(58) Field of Classification Search ............... 702/69, 702/182–185, 188; 73/204.11
See application file for complete search history.

(56) References Cited

U.S. PATENT DOCUMENTS

| 5,832,403 | A | 11/1998 | Kowatari et al. |
| 6,334,083 | B1 | 12/2001 | Aono et al. |
| 6,397,673 | B1 | 6/2002 | Kanke et al. |
| 2005/0072225 | A1* | 4/2005 | Kanke et al. ............. 73/204.11 |

FOREIGN PATENT DOCUMENTS

| JP | 3-283800 | 12/1991 |
| JP | 6-10752 A | 1/1994 |
| JP | 8-62012 A | 3/1996 |
| JP | 8-218934 | 8/1996 |
| JP | 8-218934 A | 8/1996 |
| JP | 11-014418 A | 1/1999 |
| JP | 11-83584 A | 3/1999 |

(Continued)

OTHER PUBLICATIONS

International Search Report w/English translation dated Dec. 14, 2004 (Five (5) pages).

(Continued)

*Primary Examiner*—Edward Raymond
(74) *Attorney, Agent, or Firm*—Crowell & Moring LLP

(57) ABSTRACT

Thermal type flow rate meters for measuring the flow rate of intake air of an internal combustion engine of a motor vehicle or the like have encountered a problem of an increase in pulsation errors during high engine speed and high pulsation. Meanwhile, digitally recovering responses has posed a problem in which pulsation performance is liable to become worse, affected by variation in a clock or the like. The sensor is provided with means for transferring a response variation factor to the engine control unit. The engine control unit is provided with logics for automatically determining the variation factor and correcting a response. Means for detecting a backflow occurrence is provided and a parameter for a response recovery is changed before and after a backflow occurrence. The sensor is provided with a selecting means by which a sensor response can be selected and obtained and the engine control unit is provided means for allowing selection of a response.

15 Claims, 13 Drawing Sheets

| | FOREIGN PATENT DOCUMENTS | | JP | 2003-13789 A | 1/2003 |
|---|---|---|---|---|---|
| JP | 11-94620 A | 4/1999 | | | |
| JP | 2000-161122 | 6/2000 | | OTHER PUBLICATIONS | |
| JP | 2000-161122 A | 6/2000 | | | |
| JP | 2002-295292 | 10/2002 | | | |
| JP | 2002-295292 A | 10/2002 | | | |
| JP | 2003-4496 | 1/2003 | | | |
| JP | 2003-4496 A | 1/2003 | | | |

PCT/IB/338, PCT/IB/373 and PCT/ISA/237 (Five (5) pages).
European Search Report dated Mar. 6, 2008 (Three (3) pages).
Chinese Office Action mailed Mar. 7, 2008.

* cited by examiner

FIG. 3
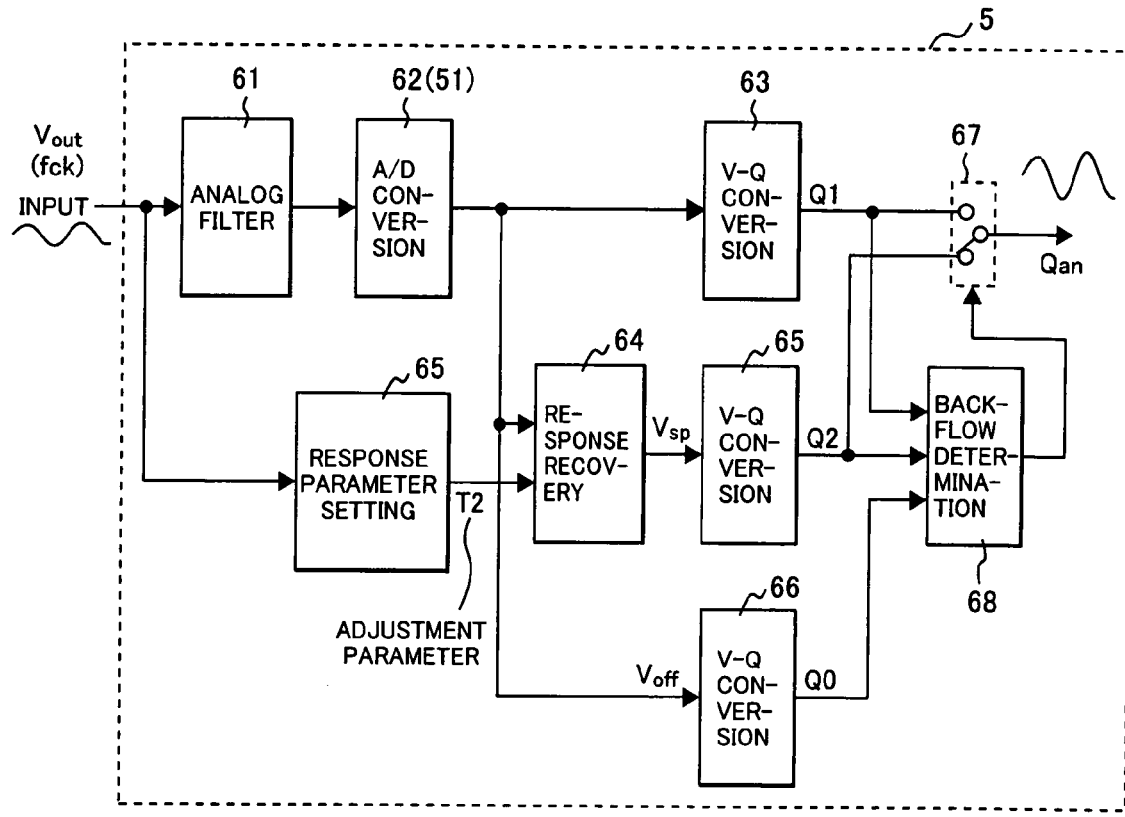
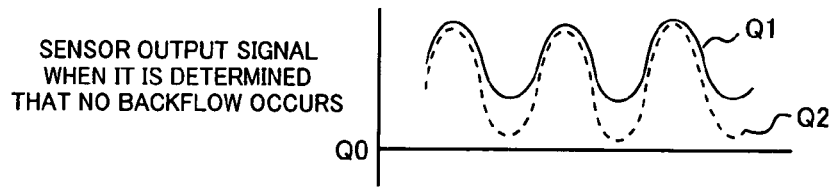
FIG. 4A
SENSOR OUTPUT SIGNAL
WHEN IT IS DETERMINED
THAT NO BACKFLOW OCCURS
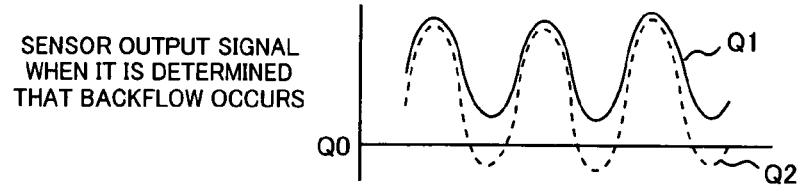
FIG. 4B
SENSOR OUTPUT SIGNAL
WHEN IT IS DETERMINED
THAT BACKFLOW OCCURS

SENSOR OUTPUT SIGNAL
WHEN IT IS DETERMINED
THAT NO BACKFLOW OCCURS

SENSOR OUTPUT SIGNAL
WHEN IT IS DETERMINED
THAT BACKFLOW OCCURS

CLOCK MODE

IMMEDIATELY AFTER TURN-ON OF VB

OUTPUT RECOVERY DETERMINATION MODE

AT TIME OTHER THAN IMMEDIATELY AFTER TURN-ON OF VB

THERMAL TYPE FLOW RATE MEASUREMENT APPARATUS

TECHNICAL FIELD

The present invention relates to a thermal type flow rate measurement apparatus for measuring a flow rate of a fluid such as air.

BACKGROUND ART

Thermal type air flow rate measurement apparatus (a thermal type air flow meter), which has thermal sensitive resistors such as a heating resistor and temperature compensating resistor having a temperature characteristic, is cable of directly measuring a mass air flow rate. Therefore, it is widely diffused to measure a flow rate of an intake air for an internal combustion engine of a motor vehicle or the like. A signal of the measured air flow rate is provided for, e.g., calculating a fuel injection quantity of an electronically controlled fuel injector.

As a thermal sensitive resistor such as a heating resistor, a hot wire flowmeter, which is configured by winding a platinum wire on a bobbin and coating the wound bobbin with glass, is widely diffused for practical use. In addition to that, in recent years, a thin-film flowmeter in which thin film resistors is formed on a ceramic or silicon substrate and a semiconductor flowmeter made of, e.g., polysilicon have been proposed.

Generally, there are two kind of flow rate measurement ways: one is a measurement way of controlling a heating volume of a heating resistor on a flow passage so as to maintain a predetermined temperature difference between the heating resistor and a temperature compensating resistor, and directly sensing a current flowing through the heating resistor to measure the flow rate; the other is a measurement way of arranging temperature sensing resistors upstream and downstream of a heating resistor respectively and obtaining a temperature difference between both temperature sensing resistors to measure the flow rate. Both measurement ways make use of the resistance temperature characteristic that changes when the thermal sensitive resistors exchange heat with the fluid.

When using flow rate sensing elements having a relatively large response delay of its output, it is necessary to correct the response delay by inverse conversion of a time constant corresponding to the response delay. This correction of response delay is performed on the sensor side at a stage (pre-processing) before a flow rate signal is taken in to a controller (e.g., an engine control unit described in, e.g., Japanese Laid-Open Patent Publication No. Hei 8-62012 and Japanese Laid-Open Patent Publication No. Hei 11-14418) or performed on the engine control unit side (it's described in, e.g., Japanese Laid-Open Patent Publication No. Hei 6-10752 and Japanese Laid-Open Patent Publication No. 2003-13789).

The former is an example of digitally correcting the characteristic of the flow rate meter (sensor) and the latter is an example of a manner of correcting a measurement error due to a response delay of the sensor, on the engine control unit side. Both correcting ways are used to improve the response delay of the sensor having a large response delay.

A thermal type flow rate sensor has a nonlinear output characteristic and the output may have a pulsation due to a backflow from an engine or the like. These factors cause an error in an output signal. In order to such an error, the conventional technical example, in which the output signal from the sensor is digitally corrected by the sensor circuit before it is output to the engine control unit, is disclosed in, e.g., Japanese Laid-Open Patent Publication No. Hei 11-94620.

Patent Document 1: Japanese Laid-Open Patent Publication No. Hei 8-62012
Patent Document 2: Japanese Laid-Open Patent Publication No. Hei 11-14418
Patent Document 3: Japanese Laid-Open Patent Publication No. Hei 6-10752
Patent Document 4: Japanese Laid-Open Patent Publication No. 2003-13789
Patent Document 5: Japanese Laid-Open Patent Publication No. Hei 11-94620

SUMMARY OF THE INVENTION

Problems to be Solved by the Invention

In general, a relationship between an output of a thermal type flow rate meter using a heating resistor and an air flow rate is expressed by the following equation which is called King's equation $$Ih^2 \cdot Rh = C1 + C2\sqrt{Q})(Th-Ta) \qquad (1)$$

where, Ih is a current flowing through the heating resistor, Rh is a resistance of the heating resistor, Th is a surface temperature of the heating resistor, Ta is a temperature of the air, Q is an air flowrate, and C1, C2 are constants determined for the heating resistor.

The output of the air flow meter is generally produced by converting the current Ih flowing through the heating resistor into a voltage value by a voltage sensing resistor. The engine control unit used for control of an internal combustion engine converts the output voltage value of the sensor into a flow rate value based on the relationship of equation (1), and then uses the flow rate to control, e.g., a ratio between air and fuel to be supplied into the internal combustion engine.

In this way, since the thermal type flow rate meter-output signal to the actual flow rate is nonlinear (the voltage value is represented by a fourth root of the air flow), as expressed in equation (1), any means for linearization is needed to measure the flow rate.

In the above-mentioned prior arts, when the response of the flow rate sensing elements to a dynamic flow change such as pulsation is slow, there is occurred a problem that a pulsation error of the sensor output may be induced by the nonlinear characteristic of the sensor.

Such a problem can be coped with to some extent by improvements such as the inverse conversion for correcting the sensor responsiveness or by signal correction in a moderate pulsation operating range. However, it is hard to overcome the problem in a greater pulsation range than the moderate pulsation operation range at a higher engine speed, higher pulsation, and the like, and an improvement in the sensor's characteristic has been called for.

For recent engines, for example, a variable length intake runner system is proposed to increase the output in a high engine speed range. This system intends to realize a high output of the engine by increasing intake air pulsation, which is liable to occur in a low engine speed range, even in the high engine speed range (for example, in the high engine speed range, the effective length of an intake pipe is changed to produce intake air resonance of the engine, thereby increasing the air intake pulsation), thus increasing the intake air efficiency in the high engine speed range.

However air intake pulsation occurring in the high engine speed range may result in decreasing the accuracy of air flow rate measurement due to sensor element (heating resistor)

response delay. To prevent the response delay due to this air intake pulsation, it is conceivable to eliminate the response delay by using a recovery parameter to the response delay (lead compensating gain). However, if response recovery processing is performed uniformly over the entire operating range of the engine, it may happen that response delay is over-corrected in an operating range where pulsation is not so large (with little resonance) and this adversely decreases the accuracy of air flow rate measurement.

In view of the foregoing, the present invention has been contrived and its object is to reduce the pulsation error in a flow rate meter adaptively depending on the amplitude and/or frequency of the pulsation in a situation where intake air pulsation or a backflow occurs in the engine.

Means for Solving the Problem

The present invention has the following configuration basically in a thermal type flow rate measurement apparatus. The thermal type flow rate measurement apparatus comprises a flow rate sensing element for sensing a flow rate of a fluid and capable of also sensing a forward flow and a backflow of a pulsating flow. Furthermore the apparatus is characterized by comprising a response recovery means for recovering a response delay of an output signal from the flow rate sensing element, and a determination means for determining whether or not to execute the response recovery or for changing a parameter value for response recovery, in accordance with a pulsation state of the output signal of the flow rate sensing element. The pulsation state of the output signal of the flow rate sensing element is, for example, the presence or absence of a backflow occurrence or an estimated amount of a backflow.

The flow rate measurement apparatus configured as above is capable of compensating the response delay of an intake air flow rate signal by changing a compensation parameter (lead gain) for the response delay adaptively in accordance with a run range where only a forward flow occurs and a pulsation run range where a back flow occurs.

Advantageous Effect of the Invention

According to the present invention, during pulsation or transient response of flow rates, the accuracy of flow rate measurements during pulsation or response is improved without losing signal characteristics properly sensed by a sensor. In particular, it is possible to realize a flow rate meter in which variation in correction can be reduced under execution of correction for response recovery. In motor vehicle application, improving the driving performance and productivity can easily be achieved. In engine control application, by decreasing measurement errors during pulsation at a high engine speed, engine power improvement and more accurate control can be performed and reduced exhaust gas and improved fuel consumption can be achieved.

BRIEF DESCRIPTION OF THE DRAWINGS

FIG. 3 is a block diagram illustrating digital processing in an engine control unit used in the above embodiment.

FIG. 4 is a graphic representation to explain backflow determination according to the above embodiment.

LIST OF REFERENCE NUMERALS

1: Drive circuit for flow rate sensing elements, 2: Digital processing device, 3: Power supply circuit, 4: Flow rate sensor, 5: Engine control unit, 11: Heating resistor, 12: Temperature compensating resistor, 42: Response recovery processing, 211: Silicon substrate, 211*d*, 211*e*, 211*f*, 211*g*: Temperature sensing resistors

BEST MODE FOR CARRYING OUT THE INVENTION

Preferred embodiments of the present invention are described based on the drawings.

Figure 1:
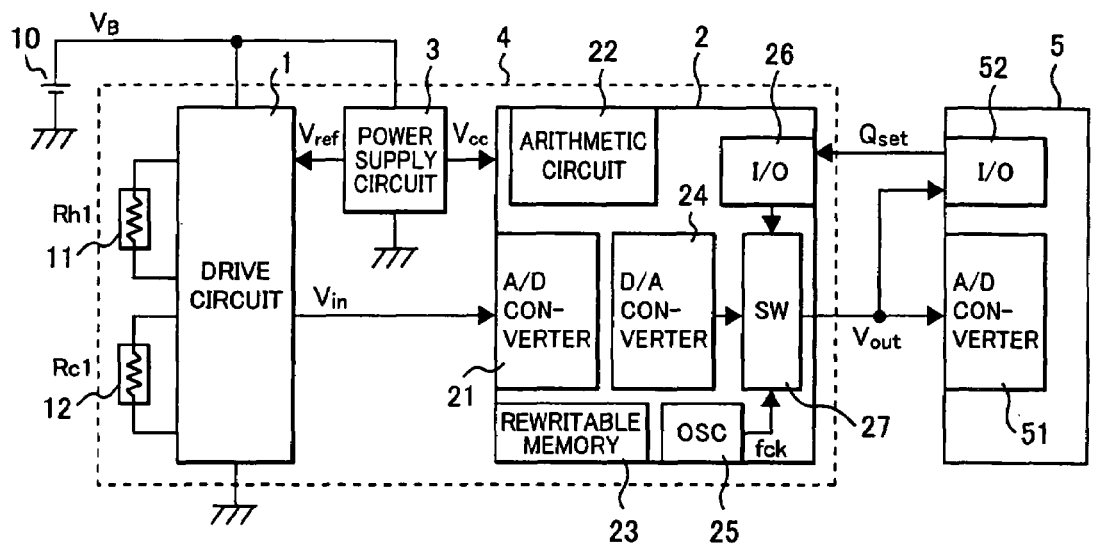
FIG. 1 is a system configuration diagram of a flow rate measurement apparatus relevant to a first embodiment of the invention.
Figure 2:
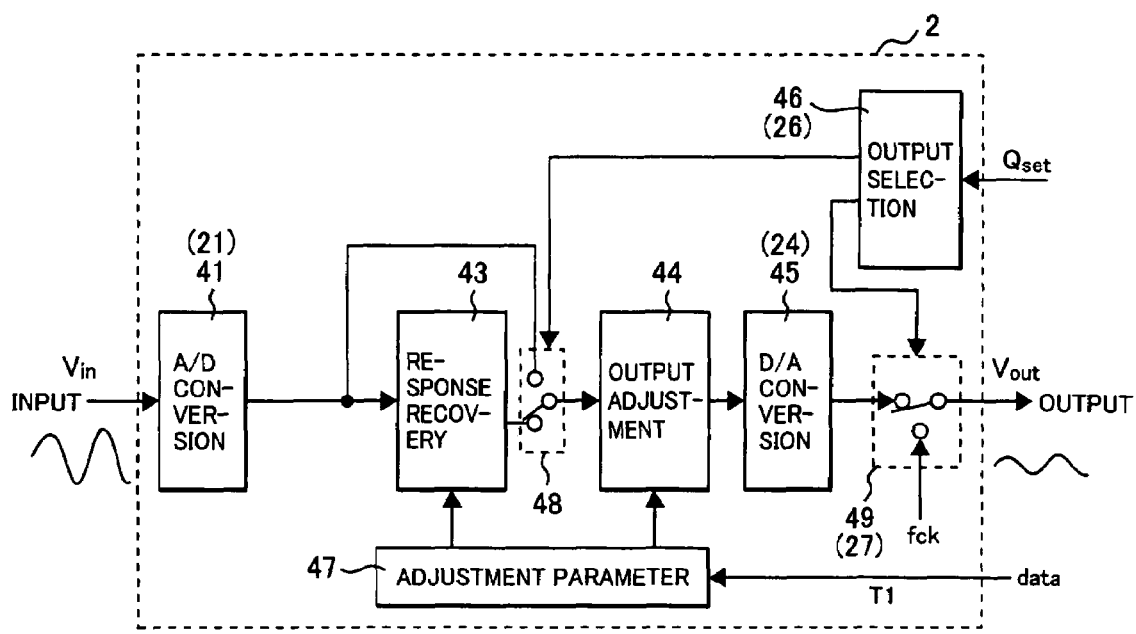
FIG. 2 is a block diagram of arithmetic processing which is performed by a digital processing device of the above flow rate measurement apparatus.

FIG. 1 shows a system configuration of a flow rate measurement apparatus relevant to a first embodiment of the invention. FIG. 2 shows a digital processing device 2 that preprocesses an output of an air flow rate sensor 4 of the first embodiment and sends the output to a controller (control unit; signal processing unit) 5. In the present embodiment, the flow rate measurement apparatus is comprised of the flow rate sensor 4 and a part of the engine controller 5; however, all components of the apparatus can be integrated into only the flow rate sensor 4.

In FIG. 1, the sensor 4 comprises a drive circuit 1 for a thermal type flow rate sensing element (flow rate measuring element), a power supply 10, and a digital processing device 2.

The drive circuit 1 is connected to a power supply and controls the heating of the heating resistor 11 so as to maintain a predetermined temperature difference between the heating resistor 11 and a temperature compensating resistor 12, by controlling a current flowing through a heating resistor 11. The heating resistor 11 is placed on an air intake passage in which the flow rate is measured and exchanges heat with the fluid depending on the flow rate (flow speed). As the flow rate increases, the amount of heat dissipated from the heating resistor 11 to the air flow increases. Thus, the current for heating will increase to maintain a constant temperature difference between the heating resistor 11 and the temperature compensating resistor 12.

As a flow rate signal, a voltage output signal into which the current flowing through the heating resistor 11 was converted is used. Alternatively, temperature sensing resistors (not shown in FIG. 1; but shown in FIGS. 9 to 11) are arranged upstream and downstream of the heating resistor 11 and a signal corresponding to an output difference between these temperature sensing resistors is used.

The latter type is adopted based on the principle that the temperature of one temperature sensing resistor positioned upstream of the heating resistor becomes lower than that of the other temperature sensing resistor positioned downstream of the heating resistor, as the flow rate increases, and obtains the air flow rate from a difference between the output signals of both temperature sensing resistors. This type has an advantage that it can also sense the direction of the fluid flow.

An output of the flow rate sensing element (the heating resistor or temperature sensing resistors) is nonlinear and includes a pulsation component. Such nonlinearity and pulsation cause an error in the flow rate sensed as an output signal. The digital processing device 2 is provided to correct such an error and serves as a preprocessing unit for the engine controller (signal processing unit) 5 in the following stage. The digital processing device 2 comprises a digital means including a microcomputer or application specific logics.

In the digital processing device 2, an output signal (flow rate signal) Vin of the drive circuit 1 is converted into a digital value by an analog-digital converter (A/D converter) 21. An arithmetic circuit 22 performs an error correction (e.g., linearizing the signal) to this digital signal by using corrective data prestored in a rewritable memory 23. The corrected digital signal is converted into a voltage value equivalent to the output of the drive circuit 1 by a digital-analog converter (D/A converter) 24 and, then, output via an output signal selecting means (selector switch) 27 to the engine controller 5.

Here, the selector switch 27 performs a switching operation according to a select signal Qset input via an input/output port (I/O) 26 from the engine controller 5. By this switching, either a reference clock signal fck from an oscillator (OSC) 25 or an output Vout of the digital-analog converter (D/A converter) 24 can be selected and output.

In the engine controller 5, an output signal Vout of the flow rate measurement apparatus 4 is converted into a digital value by an analog-digital converter 51 and used in a calculation for engine control. At the same time, the controller 5 takes in the output signal Vout via an input/output port (I/O) 52. A signal other than an output signal Vout, such as a reference clock fck, as mentioned above, may be take in optionally.

Here, a flow of arithmetic processing that is performed by the arithmetic circuit 22 of the digital processing circuit 2 is explained, referring to FIG. 2.

When an output Vin of the sensor circuit 1 is taken in to the digital processing circuit, this analog signal is converted into a digital value by analog-digital conversion processing 41 (which is performed by the A/D converter 21 in FIG. 1). When response recovery is selected by a switch (soft switch) 48 by software for output switching, the arithmetic circuit 22 executes a response recovery processing 43 and an output adjustment processing 44 to a flow rate signal (digital signal). The response recovery processing 43 provides a lead compensation to the sensor out put signal to correct the response delay of the sensor output signal, by using an adjustment parameter T1 (47) for response recovery. Although the parameter T1 is described as only one typical time constant T1 herein, a plurality of parameters may be available.

The adjusted output signal is then converted into an analog signal by digital-analog conversion processing 45 (which is performed by the D/A converter 24 in FIG. 1) and optionally output via a soft switch (corresponding to the switch 27 in FIG. 1) to the engine controller 5.

An output selection processing 46 selects whether or not to execute the response recovery processing 43 via the soft switch 48 and selectively outputs either the output signal Vout or the reference clock signal fck via a soft switch 49. This output selection processing 46 is performed by the I/O 26 and I/O 52 mentioned in FIG. 1, according to a control signal Qset from the engine controller 5.

As described above, the air flow rate sensor 4 can output different signals such as the voltage output Vout and the reference clock fck selectably through a single signal line via the switch 49. This selection may be performed according to a decision as to whether a certain condition is fulfilled and the decision made by the digital processing device 2 itself, instead of the select signal Qset provided externally from the engine controller.

Next, a flow of arithmetic processing in the engine controller 5 will be explained, referring to FIG. 3.

In the engine controller 5, an analog output signal Vout from the sensor 4, after passing through an analog filter 61, is converted into a digital value by analog-digital conversion 62 (which is performed by the A/D converter 51 in FIG. 1). Then, the output signal Vout is (1) converted directly into a flow rate value Q1 by V-Q conversion (voltage-flow rate conversion) 63 or (2) subjected to a response recovery processing 64 to improve its responsiveness (the thus improved signal is also referred to as a response recovery signal or a response delay corrected signal and a voltage corresponding to this improved signal is represented as Vsp) and this Vsp is converted into a flow rate value Q2 by V-Q conversion (voltage-flow rate conversion) 65; either of these results is selected by an output selector soft switch 67.

In the above signal processing (1), a signal Q1 not subjected to special processing is obtained as a flowrate signal Qan. In the other signal processing (2), a signal Q2 whose response has been adjusted by an adjustment parameter T2 for response recovery is obtained as a flow rate signal Qan. Although the parameter is described as only one typical time constant T2 herein, a plurality of parameters may be available. Selection of Q1 or Q2 is performed by the soft switch 67.

Switching of the soft switch 67 is performed, according to a result of a backflow determination processing 68 whether or not backflow occurs.

The backflow determination processing 68 takes in a zero flow rate value Q0 obtained by V-Q conversion (voltage-flow rate conversion) 66 for an output (zero flow) V of f of the flow rate sensor 4 when the air flow rate is zero during the engine being stopped (e.g., before an engine startup or when the engine is not running after the power supply is turned on by an ignition switch). In addition to Q0, the backflow determination 68 takes in Q1 and Q2 obtained by the above conversions (1), (2). By using Q1, Q2, and Q0, the backflow determination processing 68 can precisely sense whether or not a backflow occurs in a pulsating airflow flowing through the engine air intake passage. How to determine whether a backflow occurs is explained, using FIG. 4.

FIG. 4(a) shows Q1 and Q2 waveforms in which both flow rate values Q1 and Q2 including a pulsation component are larger than the zero flow rate Q0. Here, the flow rate value Q2 subjected to response recovery (represented by a dotted line) has a larger amplitude than the flow rate value Q1 not subjected to response recovery (represented by a solid line). When these two signals Q1, Q2 are larger than the flow rate value Q0 (Q1>Q0; Q2>Q0), the determination processing 68 determines that no backflow occurs. This state is observed, for example, when a pulsating intake air flow occurs in a low engine speed range.

On the other hand, as shown in FIG. 4(b), when the lower limit of the flow rate value Q2 is smaller than the flow rate value Q0 (Q2 is partially negative), though the flow rate value Q1 is larger than the flow rate value Q0, the determination processing 68 determines that a backflow occurs. In this way, it can surely be sensed whether a backflow occurs immediately before the backflow occur and the accuracy (or sensitivity) of sensing a backflow occurrence can be improved. A backflow may be occurred when allowing to take place an intake air pulsation in order to enhance the intake air efficiency in a high engine speed range, for example, as in the above-mentioned variable length intake runner system.

Switching of the soft switch 67 is controlled according to the determination as to whether a backflow is included in a pulsating air flow (fluid). In particular, when it is determined that no backflow occurs, a pulsating flow takes place in a low engine speed range and almost no response delay occurs in the output of the flow rate sensing element. In this case, the soft switch 48 in the sensor 2 does not select the response recovery processing 43 and the soft switch 67 selects a flow rate value Q1. When it is determined that a backflow occurs, a pulsating flow takes place in a high engine speed range. In this case, the response recoveries processing 43 and 64 are selected by the above soft switches 48 and 64, and a flow rate value Q2 is selected.

(a) In the present embodiment, both the flow rate sensor 4 and the engine controller 5 have response recovery functions respectively and, therefore, the response recovery processing load is shared by the sensor 4 and the engine controller 5 at a predetermined ratio.

For example, when the backflow determination processing 68 determines that a backflow occur, the engine controller 5 sends a Qset signal to the sensor 4 to allow the sensor to select the response recovery processing 43 via the switch 48, and the engine controller 5 also selects the response recovery processing 64 by the switch 67 in the engine controller end. Thereby, both response recoveries are executed at a predetermined ratio. An advantage of executing both response recoveries at the same time in this way is as follows. Practical devices in the measurement apparatus have different characteristics in terms of connections between circuits and related filter types installed in each individual device, sampling between devices, etc. The manner in which the sensor and the engine controller execute partial response recoveries according to their respective characteristics may produce more desirable results (better performance). Therefore, a ratio of response recoveries between the sensor and the controller may be set at, for example, 5:5 (50% by each), 7:3, or 3:7.

When both response recoveries are selected, Q1 and Q2 values, which are objects to be determined by the backflow determination processing 68, change in comparison to them before those recoveries are selected, due to the effect of the response recovery processing 43. Consequently, when at least the response recovery processing 43 is selected, the backflow determination is prone to make an excessive determination of a backflow. To prevent this, the zero flow level Q0 is shifted negatively to a given minus value. In this way, an improper excessive determination of a backflow can be prevented.

It may be possible to render the response recovery processing 43 in the sensor 4 as main response recovery and the response recovery 64 in the engine controller 5 as sub response recovery.

Thus, it may be possible to configure so that the weight of the latter response recovery processing 64 is placed to the backflow determination processing 68. In this case, when the response recovery processing 43 is selected, the response parameter T2 used for the response recovery processing 64 in the controller 5 is replaced with a smaller value (the degree of the response recovery becomes a smaller degree). This prevents excessive response recovery and can prevent an improper excessive determination of a backflow. Hysteresis is provided at the time of switching for the response recovery in the sensor and at the time of changing parameter for the response recovery in the controller 5 in order to avoid hunting when it is determined whether to switch to response recovery (backflow judgment).

Alternatively to the above, for example, it may be possible to select either one of the response recoveries in the flow rate sensor 4 and the controller 5, when the occurrence of a backflow is determined on the controller 5 end.

Each of the above modes of processing is performed to reduce measurement errors when pulsation takes place.

The flow rate measurement apparatus of the present embodiment is suitable for use with an engine that produces pulsation to enhance the air intake efficiency even in a high engine speed range. Specifically, in a low engine speed range where almost no response delay occurs (the pulsation frequency is small), the apparatus selects "without response recovery". On the other hand, in a high engine speed range where a response delay causes a problem to be solved, the apparatus selects "with response recovery".

In this case, instead of selecting whether or not to execute response recovery, the parameter for response recovery may be changed depending on the engine speed which is in a low or high range (so that the response recovery parameter becomes larger in the high engine speed range and lower in the low engine speed range). Also in this manner, it is possible to improve (reduce) measurement errors due to responsiveness in relation to the engine operating state, as is the case for the above-described manner. Depending on not only whether or not a backflows occurs, but also the degree of a backflow, that is, an estimated amount of a backflow, the response recovery parameter may be changed.

A reference clock signal fck instead of Vout relating to a flow rate signal may be taken in to the controller optionally at a startup or the like via the output terminal of the sensor 4.

A response parameter setting 65 of the controller 5 can detect a variation in the reference clock fck by detecting a reference clock frequency and the number of pulses within a given period of time. Once a variation in the reference clock has been detected, it becomes possible to adjust the parameter used in the response recovery processing 64 automatically.

The variation in the clock fck causes a variation in the response recovery. The variation in the response recovery however can be reduced by changing the adjustment parameter for response recovery in accordance with the clock variation, so pulsation errors of the flowmeter can be reduced. At the same time, the accuracy of detecting a backflow state can be enhanced.

Figure 5:
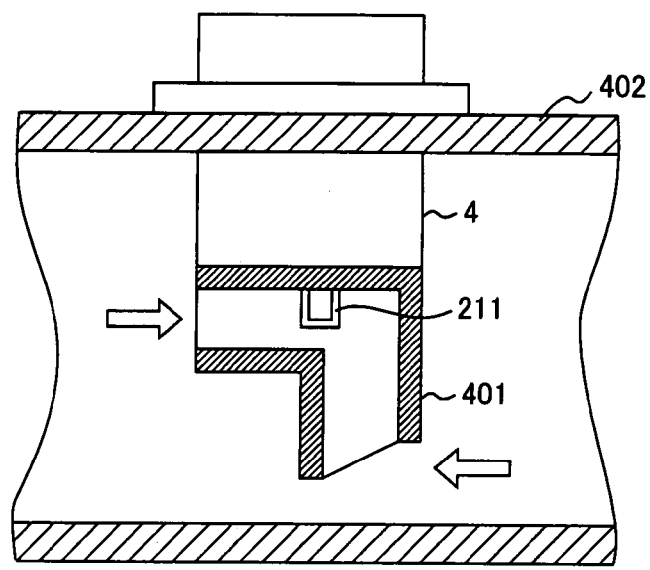
FIG. 5 is a cross sectional diagram showing an air intake passage and a bypass passage used in the above embodiment.

FIG. 5 shows a structure of a bypass passage 401 installed within a main passage 402 of a typical engine air intake passage and a flow rate sensing element 211 (a set of a heating resistor 11, a temperature compensating resistor 12, a temperature sensing resistor, or the like) placed within the bypass passage 401.

The bypass passage 401 has a bent passage structure (e.g., a substantially L-shape passage structure) that allows a forward flow to flow easily and render the flow-in of a backflow hard. By using this bypass passage structure, an error in the flow rate measured when a pulsation of the fluid occurs can be reduced.

Figure 6:
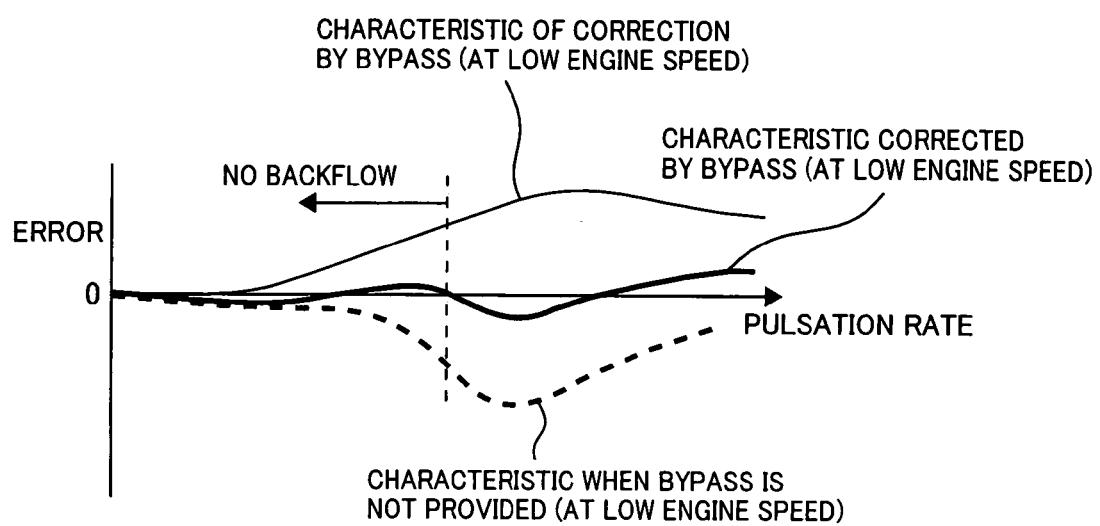
FIG. 6 is a graphic representation to explain flow rate errors due to pulsation occurring in the above bypass passage.

FIG. 6 shows an effect of improving pulsation errors at a low engine speed by the bypass passage 401. In FIG. 6, the horizontal axis of a graph indicates a pulsation rate as a pulsation amplitude, the longitudinal axis of the graph indicates the amplitude of a pulsation error in flow rate measurement.

In a case where the bypass passage 401 is not provided, the flow rate meter has a characteristic in which a negative error in the flow rate measurement increases as the pulsation rate increases, due to a response delay attributed to, inter alia, the heat capacity of the heating resistor 11. Especially when a backflow occurs, the negative error increases significantly. On the other hand, in a case where the flow rate sensing element 211 is placed in the bypass passage 401, the error can be corrected to the positive side by the characteristic of correction by the bypass and the pulsation error corrected by the bypass exhibits an error characteristic with a relatively small variation.

However, the response delay of the flow rate sensing element 211 becomes larger as the engine speed becomes high, it may be hard to correct the error by the bypass passage only.

Figure 7:
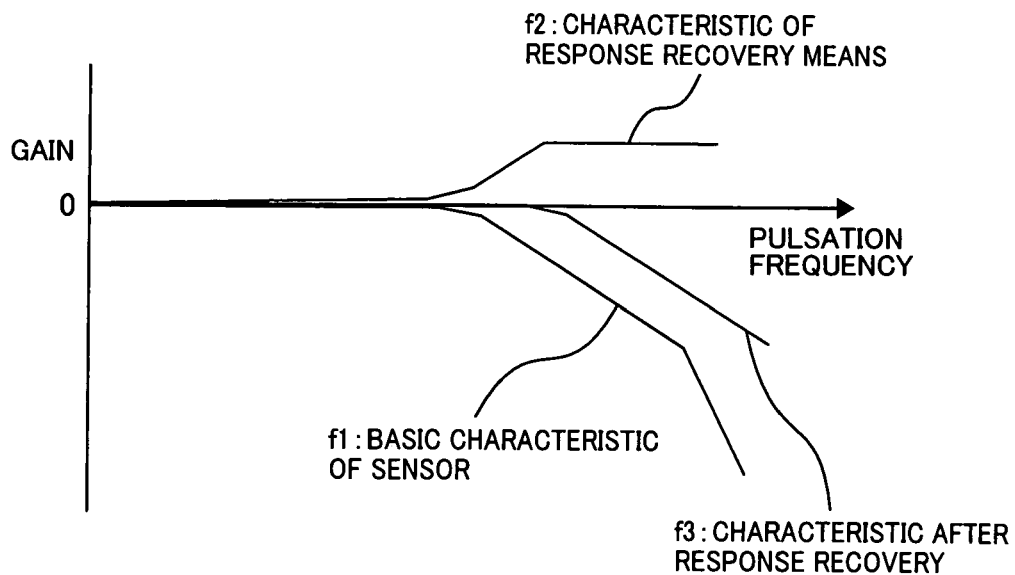
FIG. 7 is a graphic representation to explain a frequency characteristic of a flow rate sensor.

FIG. 7 shows frequency characteristics of the thermal type flow rate meter with pulsation frequency on the horizontal axis of a graph and gain on the longitudinal axis of the graph. A basic frequency characteristic f1 of the thermal type flow rate meter has a gain characteristic corresponding to a low pass filter in which the gain decrease with an increase in pulsation frequency. On the other hand, in order to make use of the thermal type flow rate meter up to an operating pulsation frequency, the pulsation frequency-gain characteristic is improved by a characteristic f2 of response recovery means and, thereby, a characteristic f3 after response recovery can be obtained.

Figure 8:
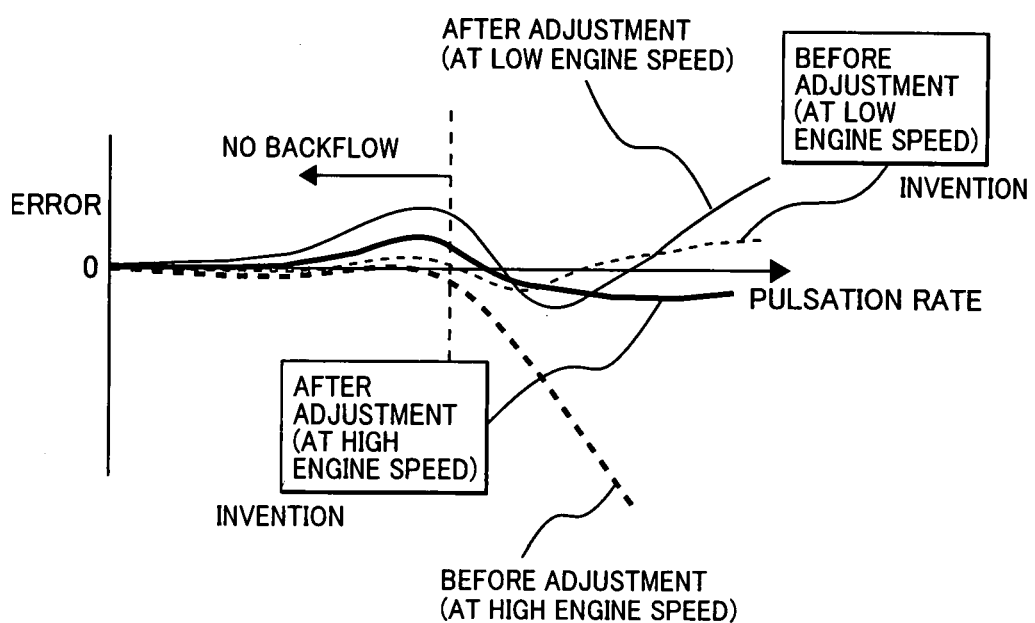
FIG. 8 is a graphic representation to explain decreasing pulsation errors by the present invention.

FIG. 8 shows characteristic of the present embodiment using the characteristic after response recovery. In a case of being in the high engine speed range (where the pulsation frequency is high) before the adjustment by response recovery, a negative error in the detected flow rate increases in a pulsation range after a backflow occurring. In a case where the pulsation error greatly changes depending on the engine speed (pulsation frequency) as indicated above, it is hard to correct the error by the bypass only. On the other hand, in the low engine speed range, the error decreases in the characteristic corrected by the bypass and further correction may be unnecessary.

As indicated above, an optimal value of the corrective parameter for response recovery becomes different depending on the engine speed; a optimal value for the low engine speed range may differ from that for the high engine speed range. Therefore, the use of a fixed corrective parameter gives rise to the following problem. If, in all case, a response delay is corrected with, for example, a corrective parameter suitable for improving an error in the flow rate measurement in the high engine speed range, this correction results in increasing a positive error in the flow rate measurement in a backflow-free state in the low engine speed range.

Such a problem can be solved, as described above, by changing the parameter for response recovery (corrective parameter) depending on the engine speed which is in a low or high range, in other words, changing the corrective parameter before and after a backflow occurring, thereby optimum corrections can be achieved.

Figure 9:
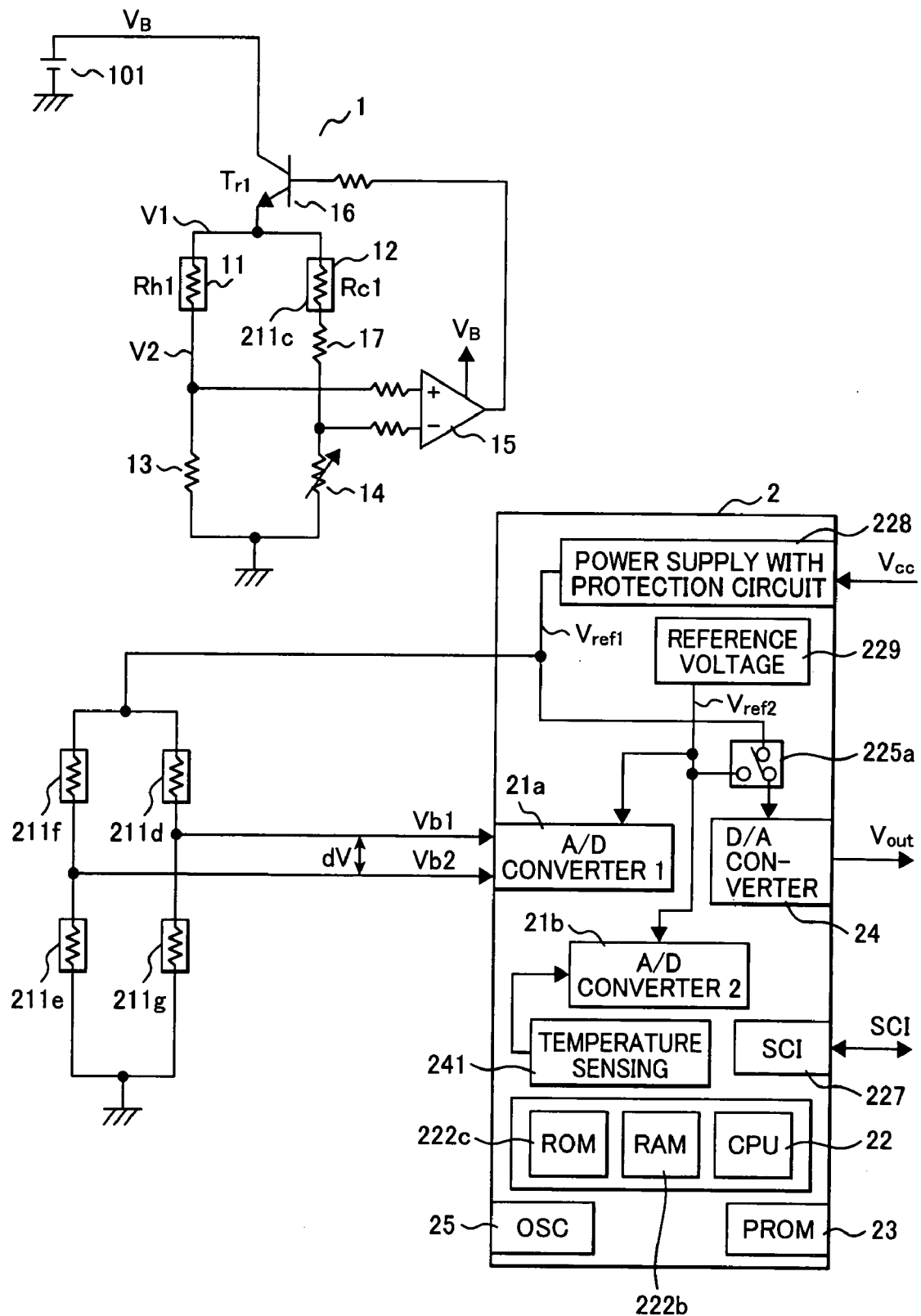
FIG. 9 is a circuit diagram of the flow rate measurement apparatus used in the above embodiment.

A concrete hardware configuration of the present embodiment is described, referring to FIG. 9.

In the flow rate measurement apparatus shown in FIG. 9, temperature sensing resistors 211$d$ to 211$g$ are placed in positions thermally affected by the heating resistor 11 (namely upstream and downstream of the heating resistor 11). This structure is capable of sensing a flow rate with the direction of the flow by sensing a voltage signal corresponding to a temperature difference between the upstream and downstream temperature sensing resistors. This type is a typical configuration example of a so-called temperature difference type flow rate meter. This arrangement is suitable for sensing a flow rate including a large pulsation; e.g., a backflow can be detected by detecting the flow direction.

The drive circuit 1 for the flow rate sensing element is connected to the power supply 10. The drive circuit 1 comprises a Wheatstone bridge circuit comprised of the heating resistor 11, temperature compensating resistor 12, and resistors 13, 14, 17. The drive circuit 1 is configured to control a current flowing through the heating resistor 11 by using a differential amplifier 15 and a transistor 16 so that the potential difference at the midpoints of the bridge becomes zero.

When the heating temperature of the heating resistor 11 is low, the output of the differential amplifier 15 increases and operates to make the resistor generate more heat. By this configuration, the current flowing through the heating resistor 11 is controlled to maintain a constant resistance or constant temperature of the heating resistor 11 independently of the air flow speed.

The temperature sensing resistors 211$d$, 211$e$, 211$f$, 211$g$ placed upstream and downstream of the heating resistor 11 constitute a bridge and a temperature difference between the resistors are sensed by a difference between potentials Vb1, Vb2 at the midpoints. This arrangement can produce an output corresponding to a flow direction.

The temperature sensing resistors 211$d$, 211$e$, 211$f$, 211$g$ are driven by a constant power supply voltage Vref1. This way of sensing a temperature difference between the resistors is highly sensitive to a low flow rate because of differential sensing and suitable for detecting a bidirectional flow such as a backflow.

Figure 10:
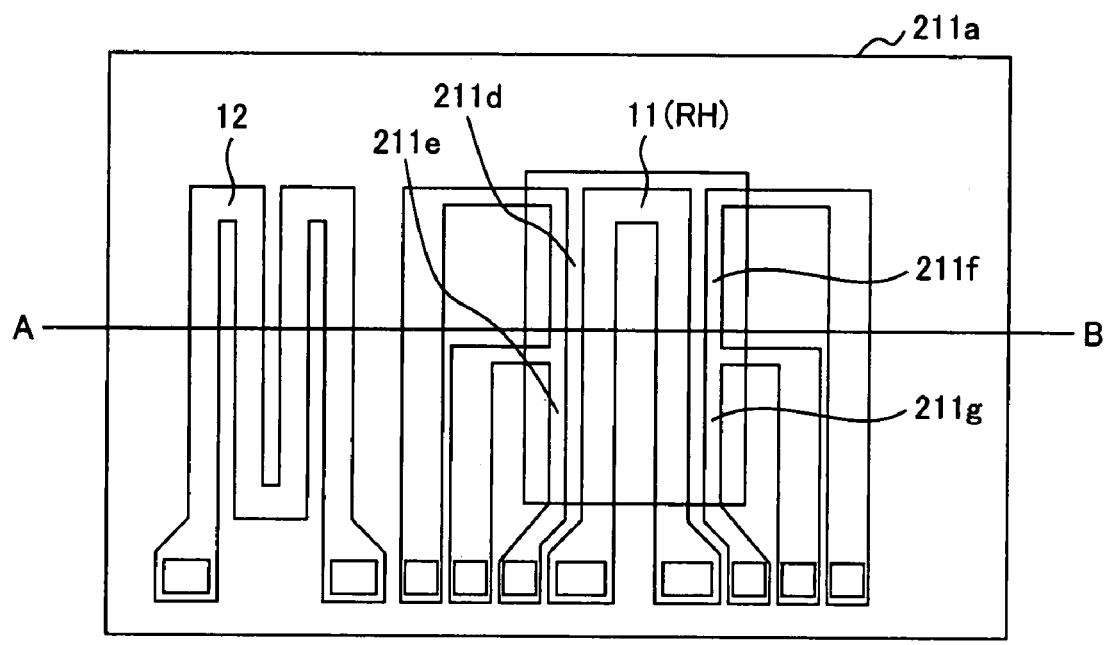
FIG. 10 is a plan view showing resistor patterns formed on a silicon substrate.

In this example, the flow rate sensing element comprising the heating resistor and temperature sensing resistors etc. are formed by a thin film technique on a silicon semiconductor substrate 211$a$ and an example of their patterns is shown in FIG. 10.

Figure 11:
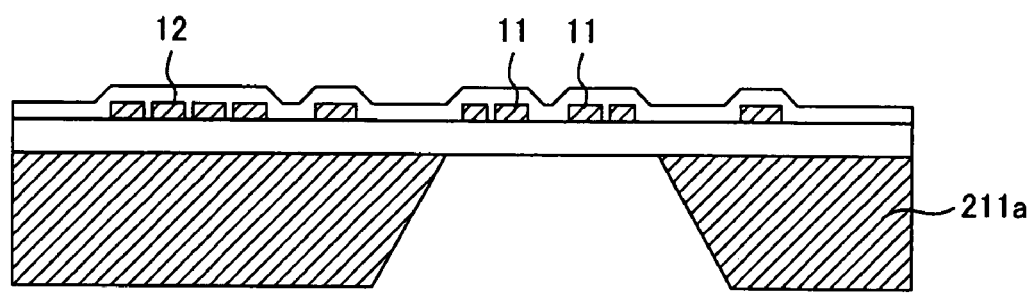
FIG. 11 is a cross sectional view of the above silicon substrate and resistors.

The heating resistor 11 is formed as a pattern in which a long resistor element is folded back, and the temperature sensing resistors 211$d$, 211$e$, 211$f$, 211$g$ are arranged on either sides the heating resistor. The heating resistor 11 and the temperature sensing resistors 211$d$, 211$e$, 211$f$, 211$g$ are, for example, arranged in a diaphragm portion with a small heat capacity. The diaphragm is etched from the back side of the silicon substrate 211a. The temperature compensating resistor 12 is placed in a position not susceptible to the heated temperature of the heating resistor 11. A cross sectional structure is shown in FIG. 11. In the thickest portion of this structure, the patterns of the temperature sensing resistors and the temperature compensating resistor are located.

In the present embodiment, the potentials Vb1, Vb2 at the midpoints of the bridge comprised of temperature sensing resistors 211d, 211e, 211f, 211g are taken in to the digital processing device 2.

The digital processing device 2 has two analog-digital converters 21a, 21b, converts a voltage value corresponding to a flow rate into a digital value, and reads the digital value. The digital value is adjusted as digital quantity calculated by the CPU 22 and taken in to the digital-analog converter 24. An output from the digital-analog converter 24 is sent as an output voltage Vout to the engine controller or the like.

Here, the digital processing device 2 has the same configuration as in the foregoing embodiment. A voltage Vcc provided externally is supplied as a supply voltage to an internal power supply with protection circuit 228. The power supply with protection circuit 228 feeds a supply voltage Vref1 depending on the external voltage Vcc via a switch 225a to the analog-digital converters 21a, 21b and the digital-analog converter 24 as a reference voltage.

The switch 255a switches between a voltage Vref2 generated by an internal reference voltage circuit 227 of the digital processing device 2 and the above supply voltage Vref1 depending on the external voltage Vcc. The analog-digital converters 21a, 21b have to be configured precisely, because the outputs Vb1, Vb2 of the bridge circuit are directly taken in to them. In order to ensure the precision of them while reducing the size of circuit in the digital processing device, for example, $\Delta\Sigma$ type analog-digital converters should be used.

The reference voltage supplied to the digital-analog converter 24 can also be changed by the switch 225a. Because it is to freely select a reference used for doing an interface by using an analog value.

When a reference voltage for an engine controller side-analog/digital converter connected to the digital processing device 2, is the same as or changes in sync with the externally provided voltage Vcc to the digital processing device 2, the supply voltage Vref1 is used for the digital-analog converter 24 as the reference. The supply power for the digital processing device is not related with the controller, an independent reference voltage Vref2 is selected. In this manner, the digital processing device 2 can adapt to the controller easily and thereby errors in analog interface matching can be reduced.

The heating resistor 11 is comprised of: a substrate such as plate glass, ceramic, silicon; and a thin film resistor or thick film resistor made of a platinum or tungsten or a polysilicon resistor as a heating element formed on the substrate. Alternatively, the heating resistor 11 may be comprised of: a cylindrical or columnar bobbin made of an insulating material with a good heat conductivity such as ceramic; a platinum or tungsten wire as a heating element wound around the surface of the bobbin; a coating material such as glass or ceramics for coating the heating element.

The heating resistor 11, temperature sensing resistors 211d to 211g, and temperature compensating resistor 12 are installed within the air intake passage of an internal combustion engine of, e.g., a motor vehicle, and a voltage output corresponding to the flow rate of air flowing through the air intake passage is output via the differential amplifier. This voltage output is taken in to the analog-digital converter 21 built in the digital processing device 2 composed of a microcomputer, application specific logics, and other components and converted into a digital quantity.

The CPU 22 in the digital processing device 2 optionally performs the response recovery to the converted digital value and then performs output adjustment for accommodating individual variation in sensor characteristics. Then, a sensor output signal is converted into a flow rate by using a given first conversion formula fx1 and smoothed, and then is subjected to inequality linearization processing for adjusting sensitivity by using a second conversion formula fx2. After the inequality linearization processing, its output is optionally linearized again and, after that, a nonlinear voltage value through the digital-analog converter 24 is output to the engine controller or the like.

The digital processing device 2 further comprises a nonvolatile memory 222c storing referential flow rate conversion maps including the flow rate conversion formulae and programs, a rewritable memory (PROM) 23 in which individual difference information such as variation in the resistance of the heating resistor 11, smoothing levels of smoothing processing (such as frequency characteristics), adjustment parameters for changing the functions for executing inequality linearization processing, response recovery levels, and other data are stored, a random access memory (RAM) 222b which is used as a working area for arithmetic operation by the CPU 22, and an internal clock generating oscillator (OSC) 25. The rewritable memory PROM 23 may not be provided within the digital processing device 2; instead, a fuse-type ROM, an electrically erasable EEPROM, a flash ROM which is erased in blocks, a high-speed nonvolatile memory using a polarization phenomenon of a ferroelectric film may be provided.

According to the first embodiment as described above, the following advantages are provided: pulsation errors in the sensor output of the thermal type flow rate meter can be decreased; and restrictions (restriction factors such as throttle opening and engine speed) for the user on using the present sensor are reduced. Also, it is possible to realize a flow rate meter in which variation in response delay correction (response delay rectification) is reduced and improving the driving performance and productivity of motor vehicles can easily be achieved.

Figure 12:
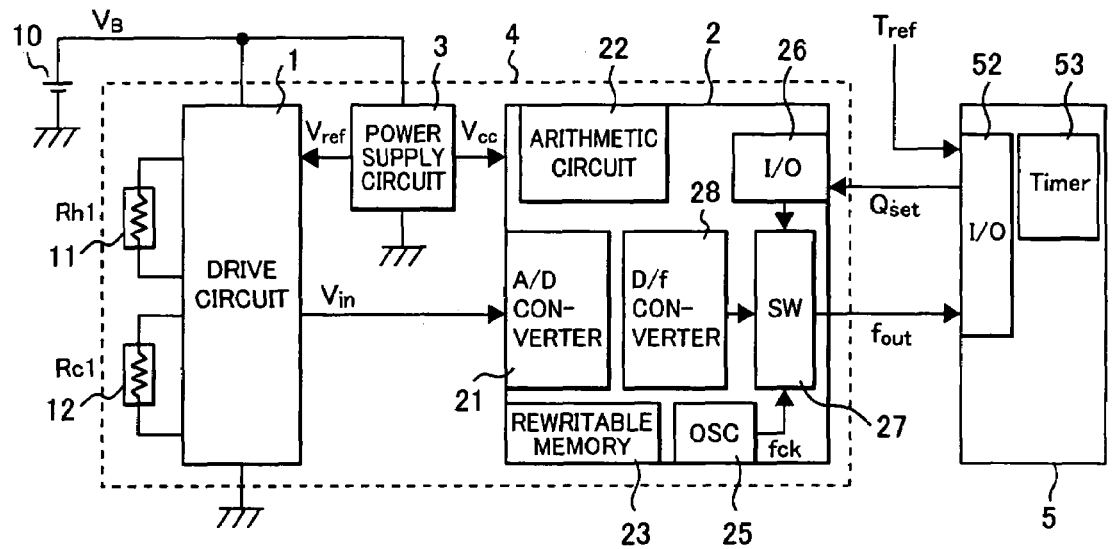
FIG. 12 is a system configuration diagram of a flow rate measurement apparatus relevant to a second embodiment of the invention.

Next, a second embodiment of the present invention is described, referring to FIG. 12. This is an example of a flow rate meter using a frequency signal as an output signal fout (corresponding to Vout in the first embodiment) of the sensor 4.

Difference from the foregoing embodiment is that a digital-frequency converter (D/F converter) 28 is used instead of the D/A converter 24 to output a signal and the second embodiment has a feature that signal superimposition is easy to do, as signals in pulses are handled. The controller 5 is provided with a timer 53 for frequency counting and is configured such that a reference signal Tref such as a crank angle of the engine can be taken in to the controller. The response of an output signal fout from the sensor can be selected and switching to a reference clock signal fck can be performed optionally, as is the case in the foregoing embodiment.

Figure 13:
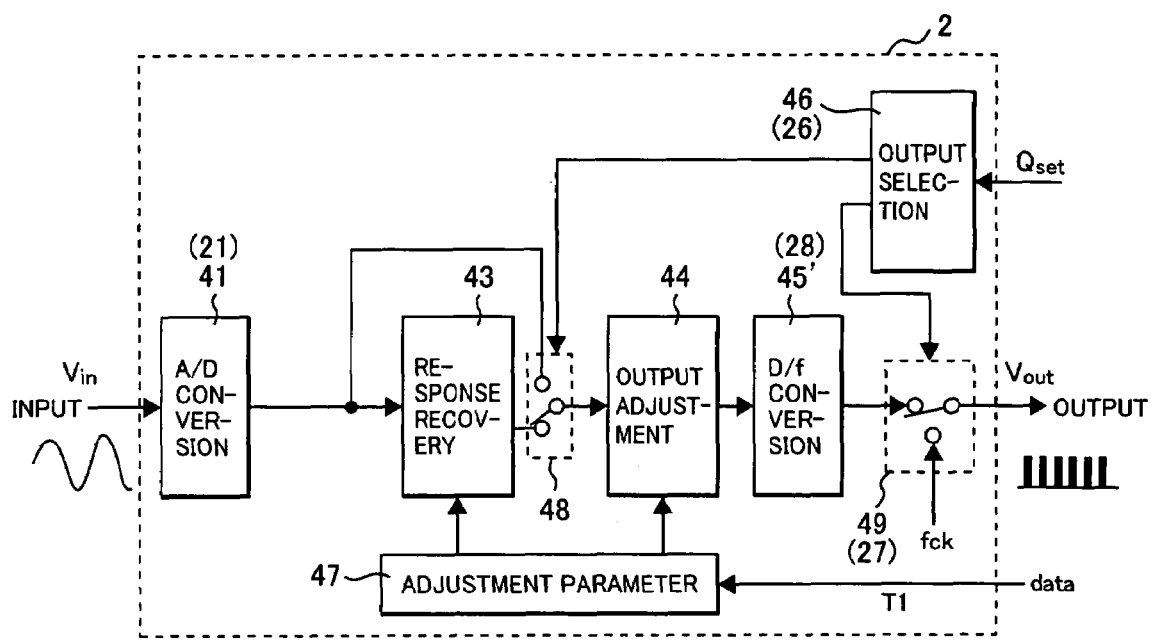
FIG. 13 is a block diagram showing a digital processing device in the above second embodiment.

A flow of detailed arithmetic processing is explained, referring to FIG. 13. The digital processing device 2 takes in an output Vin of the sensor 1, converts the analog input signal into a digital value by analog-digital conversion processing 41, optionally performs response recovery processing 43 by digital means, and performs output adjustment processing 44. The parameter T1 for the response recovery processing 43 is the same as used in the first embodiment. Although the parameter is described as only one typical time constant T1, a plurality of parameters may be available. The parameter T1 may be changed depending on whether a backflow occurs (the engine speed is high or low).

Whether or not to execute the response recovery processing 43 can be selected by a soft switch 48. After processed by the response recovery processing 43, the signal adjusted by the output adjustment processing 44 is converted into a frequency signal by digital-frequency conversion processing 45' (which is performed by the D/F converter 28) and the frequency signal is then output via a switch 49.

In the case of the second embodiment, it is possible to select and output either a flow rate signal (output frequency signal converted) fout or a reference clock signal fck output and select whether or not to execute the response recovery processing 43, by output selection carried out according to a control signal Qset from the controller 5 (or an internal signal in the sensor), as is the case in the foregoing embodiment.

Different signals of a frequency output fout and a reference clock fck can be output from the sensor 4 through a single signal line via the switch 49, according to a select instruction from the external (or repetitive processing or the like by the digital processing device 2 itself, if certain conditions are fulfilled).

Figure 14:
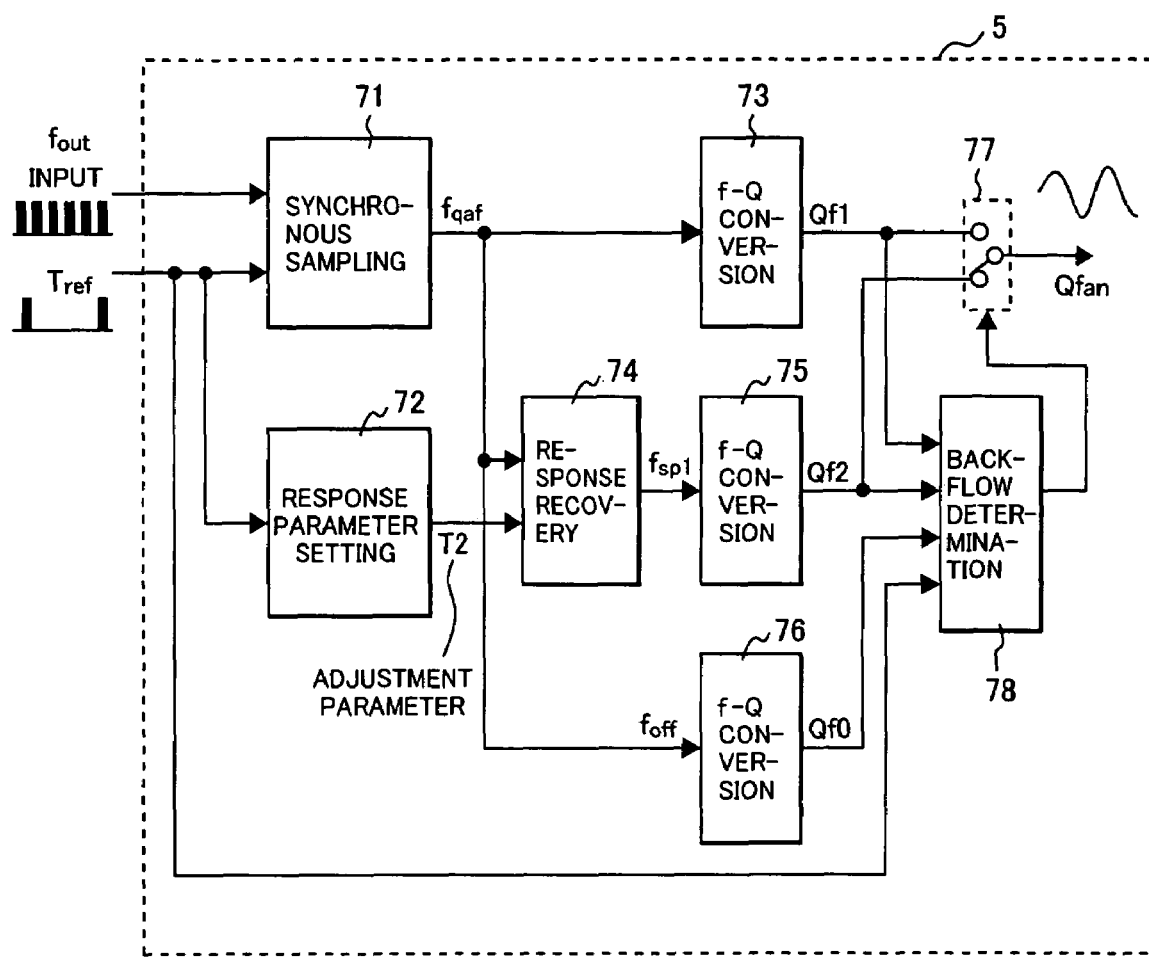
FIG. 14 is a block diagram illustrating digital processing by an engine control unit used in the above second embodiment.

Next, an arithmetic processing flow of the engine controller 5 is described, referring to FIG. 14.

The controller 5 takes in an output (frequency) fout from the sensor 1, converts it into a digital value fqaf by synchronous sampling 71, and converts the digital frequency signal fqaf into a flow rate value Qf1 by f-Q conversion processing (frequency-flow rate conversion) 73.

The above frequency signal fqaf is processed by response recovery processing 74, thereby a signal fsp corresponding to a frequency having improved response is obtained, and the fsp signal is converted into a flow rate value Qf2 by f-Q conversion (frequency-flow rate conversion) 75. The flow rate values Qf2 and Qf1 can be output selectively via a selector switch (soft switch) 77. The response recovery processing 74 in this case is performed by using the above-mentioned adjustment parameter T1 for response recovery. Although the parameter is described as only one typical time constant T2 herein, a plurality of parameters may be available. In a similar manner, a flow rate value Qf0 for a zero flow is obtained.

Backflow determination processing 78 can be made by signals or the like having response recovery, as is the case in the foregoing first embodiment. In the second embodiment, particularly, a backflow state per cycle can be measured accurately by using a simultaneous signal Trek.

Accuracy improvement such as decreasing pulsation errors can be achieved by using frequency signals, while preventing accuracy deterioration due to increase of a ground potential, which is specific to analog signals.

In the second embodiment as well, the backflow determination processing 78 can be made by signals etc. having response recovery, as is the case in the first embodiment. The signals used for the backflow judgment processing 78 are Qf1, Qf2, and Qf0. When Qf1 and Qf2 are greater than the flow rate value Qf0 (Qf1>Qf0; Qf2>Qf0), the determination processing 78 determines that no backflow occurs.

However, when the lower limit of the flow rate value Qf2 is smaller than the flow rate value Qf0 (Qf0>Qf2), though the flow rate value Qf1 is larger than the flow rate value Q0, the determination processing 78 determines that a backflow occurs.

In the second embodiment as well, when the response recovery processing 43 in the sensor 4 and the response recovery processing 74 in the engine controller 5 are performed in a mutually complementary fashion and, or when the response recovery processing 43 is selected, the reference flow rate value Qf0 for backflow determination is decreased or the response parameter T2 is replaced with a smaller value, which are the same as in the first embodiment. Thus, in both the first embodiment and the second embodiment, basically the same operations are carried out, except that the former uses flow rate signals in terms of voltage and the latter uses flow rate signals in terms of frequency.

Figure 15:
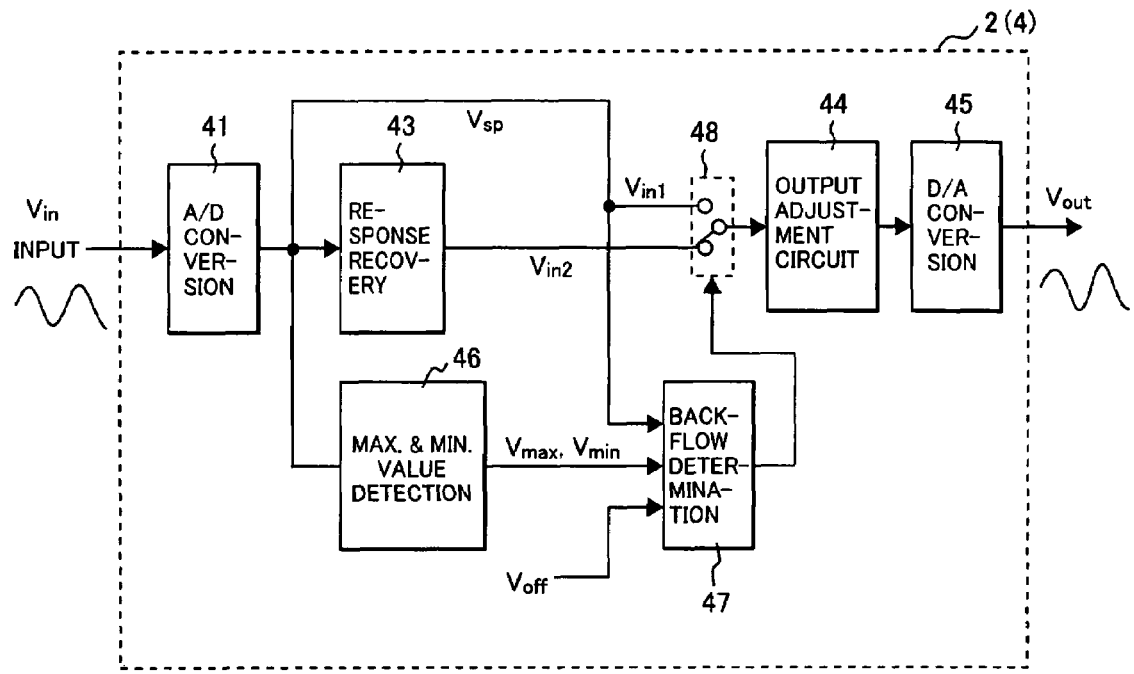
FIG. 15 is a block diagram showing a digital processing device used in a flow rate measurement apparatus relevant to a third embodiment of the invention.

Next, a third embodiment of the invention is described, referring to FIG. 15. Points that differ from the first embodiment and the second embodiment are explained below.

FIG. 15 illustrates details of arithmetic processing of the digital processing device 2 in the flow rate sensor 4 in the third embodiment of the invention.

In the third embodiment, the flow rate sensor 4 itself (digital processing device 2) determines whether a backflow occurs. The digital processing device 2 takes in an output Vin of the drive circuit 1 and converts it into a digital value by analog-digital conversion 41. The converted digital value is processed as Vin1 directly by output adjustment processing 44 through a soft switch (selector switch) 48 or processed by response recovery processing 43 by digital means (a signal having response recovery is referred to as Vin2) and, then, processed by the output adjustment processing 44.

The signal processed by the output adjustment processing 44 is converted into an analog signal by a digital-analog converter 45 and output.

In this embodiment, backflow determination processing 47 for selecting whether or not to execute the response recovery processing 43 obtains a maximum value and a minimum value in a pulsation waveform for the output value Vin 1 of the analog-digital converter 41 and determines a backflow according to correlation kg based on the maximum and minimum values. The correlation is obtained principally from the maximum value, minimum value, and a difference between the maximum value and the minimum value, as illustrated in FIG. 16.

An example of a correlation equation (2) is given below:

$$\text{Correlation } Kg = (\text{minimum value})/(\text{maximum value} - \text{minimum value}) \quad (2)$$

Figure 16A:
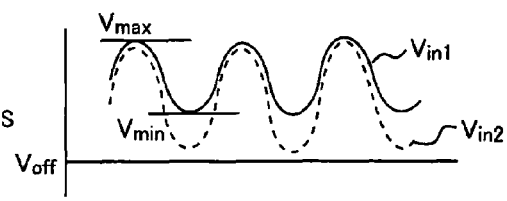
FIG. 16 is a graphic representation to explain backflow determination according to the above third embodiment.
Figure 16B:
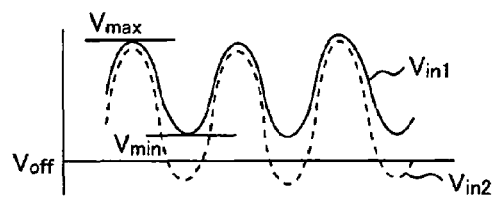
Figure 17:
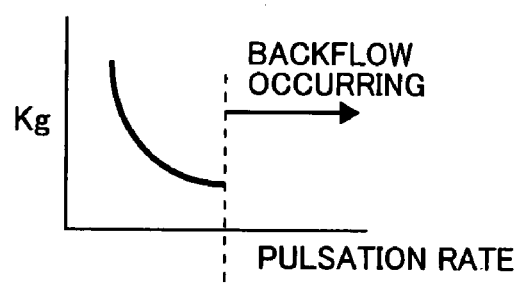
FIG. 17 is a graphic representation to explain backflow correlation used in the above third embodiment.

According to the correlation equation (2), correlation as illustrated in FIG. 17 can be obtained. When the gradient of this correlation becomes lower than or equal to a predetermined value, it can be determined (estimated) that a backflow occurs in the pulsating flow. In this case, a correlation value Kg by which a backflow is determined is set at a level at which it is estimated that Vin2 becomes lower than Voff, though Vin1 is not lower than Voff, as illustrated in FIG. 16(b). FIG. 16(a) represents Vin1 and Vin2 in a case where no backflow is determined.

According to the third embodiment, the sensor itself can determine whether pulsation errors of the flow rate occurs by self-determination without receiving a select instruction from the engine controller, and thereby can determine whether the response recovery processing should be selected. Therefore, the accuracy of flow rate measurement can be enhanced. An additional advantage of this embodiment is that the sensor 4 has enhanced compatibility as the preprocessing device for an existing engine control unit, because it is unnecessary to change the software of the engine controller by provision of some additional software in the sensor 4.

While a maximum and a minimum of voltages Vin1, Vin2 are obtained and correlation is obtained based on them, alternatively, output after the response recovery processing may be converted into a flow rate by V-Q conversion and correlation for a maximum and a minimum of the flow rate may be obtained. In the latter, a correlation function different from the former is used.

It is also possible to determine that a backflow occurs when a condition that Vin2<Voff is at least fulfilled, from the relationship among Vin1, Vin2, and Voff.

Next, a fourth embodiment of the invention is described.

In the fourth embodiment, a backflow determination processing and a selection processing whether or not to response recovery are basically the same as in the above-described embodiments. Additionally, the fourth embodiment intends to enable the following: the clock state of the used sensor (such as deterioration by time passage) and the signal type (voltage output, frequency output) to be transferred are adjusted in real time at any time by using signal SCI (serial communication interface) with an external controller such as the engine controller), the above-mentioned select signal Qset, and the like.

If it becomes possible to perform real-time adjustment or adjustment at every startup of the above clock and the like, a matching operation can be performed easily, even in a case that the air intake system or the sensor is deteriorated.

Figure 18:
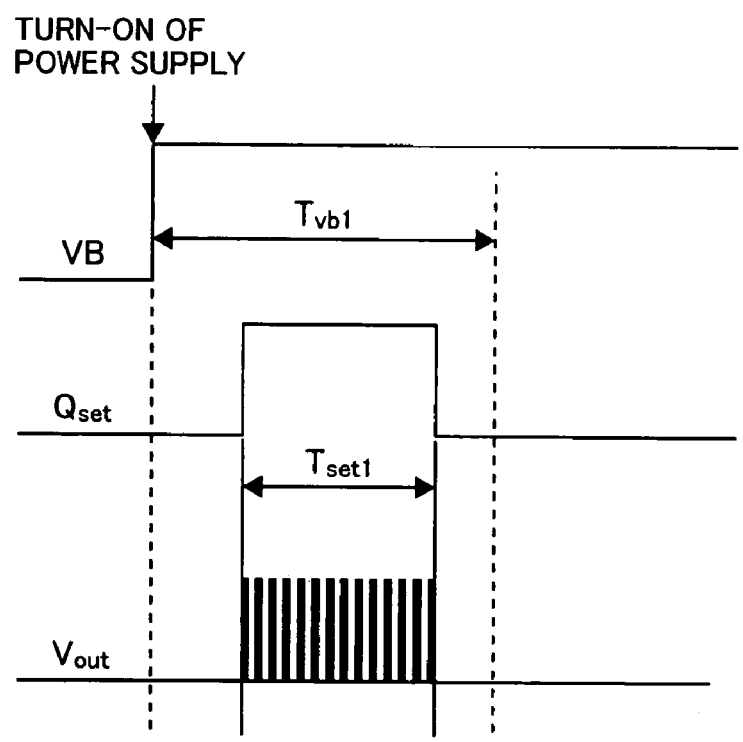
FIG. 18 is a chart to explain an output selection algorithm relevant to a fourth embodiment of the invention.

Concrete operation is described, referring to FIG. 18. the operation illustrated in FIG. 18 is performed by the sensor or the controller.

First, observing the rising edge of a battery voltage VB when the power supply is turned on, for example, a predetermined period Tvb1 following the turn-on of the battery voltage VB, which is regarded as a time immediately after the turn-on of VB, is determined from the operation of the above-described digital processing device 2 itself. In this state, when the output select signal Qset is switched to Hi for a predetermined period (Tset1), the time following the power on is determined by the output selection processing 48. Then a clock signal fck is selected, output as Vout and taken in to the controller 5. In that event, a high-frequency digital signal corresponding to the clock signal is output as the output signal. When the output selection signal Qset is switched to Lo, the selection of the clock terminates and a usual output operation for flow rate sensing is performed.

A concrete algorithm is described. When the selection value Qset is 1 (Hi), whether it is the time immediately after the turn-on of the battery voltage VB is determined. If it is the time immediately after the turn-on, as determined, a clock mode operation is performed and a clock equivalent signal fck is output as the output Vout.

If it is not the time immediately after the turn-on of the battery voltage VB, as determined, an output operation mode for flow rate sensing continues. Although the above assumes the case of voltage output, the same applies even in the case of frequency output.

Figure 19A:
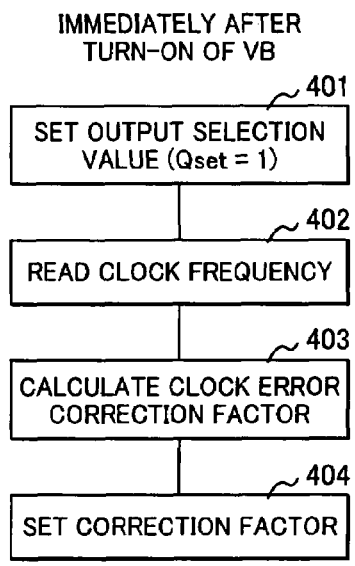
FIG. 19 is a flowchart illustrating a correction algorithm for an output selection by the controller in the above fourth embodiment.

The above operation corresponds to steps 401, 402 in an algorithm (FIG. 19(a)) that is executed by the controller 5. That is, at step 401, the output selection value Qset is set to 1 (Hi) immediately after the turn-on of VB and the clock mode is entered. Then, at step 402, the clock signal is read.

Furthermore, in the present algorithm, a correction factor to clock variation is calculated from the read clock (403). Eventually, a correction factor to correct a response due to clock variation is set and the algorithm is terminated (404).

Figure 19B:
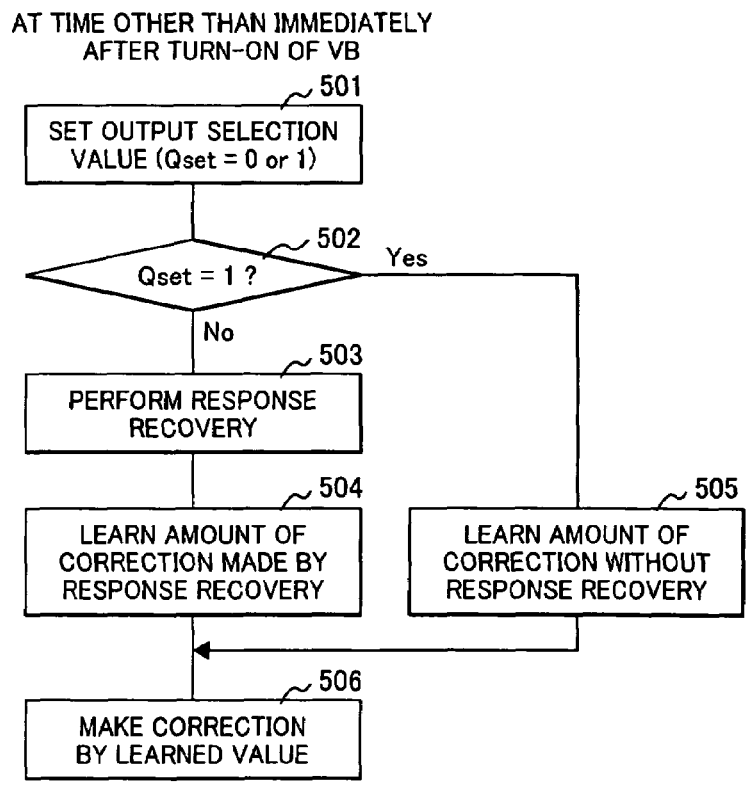

Meanwhile, FIG. 19(b) illustrates an algorithm of a response recovery determination mode performed during time other than the time immediately after the turn-on of VB.

The controller 5 sets the output selection value Qset to either 1 (Hi) or 0 (Lo) (501), thus determining whether to enter the response recovery mode by itself (502). When the output selection value Qset is 1 (Hi), the response recovery is not executed and different operations are performed. Here, for example, the controller learns the amount of correction of exhaust gases without the response recovery (505).

Otherwise, when the output selection value Qset is 0 (Lo), the controller executes response recovery (503) and learns the amount of correction of exhaust gases after the response recovery (504).

According to the present embodiment, the effect of learning about the exhaust gases can be obtained in either case when the response recovery (503) is executed or not executed and it will be easy to adapt the exhaust gases according to various conditions. These operations may be performed only during an adjustment procedure such as an exhaust test.

Figure 20:
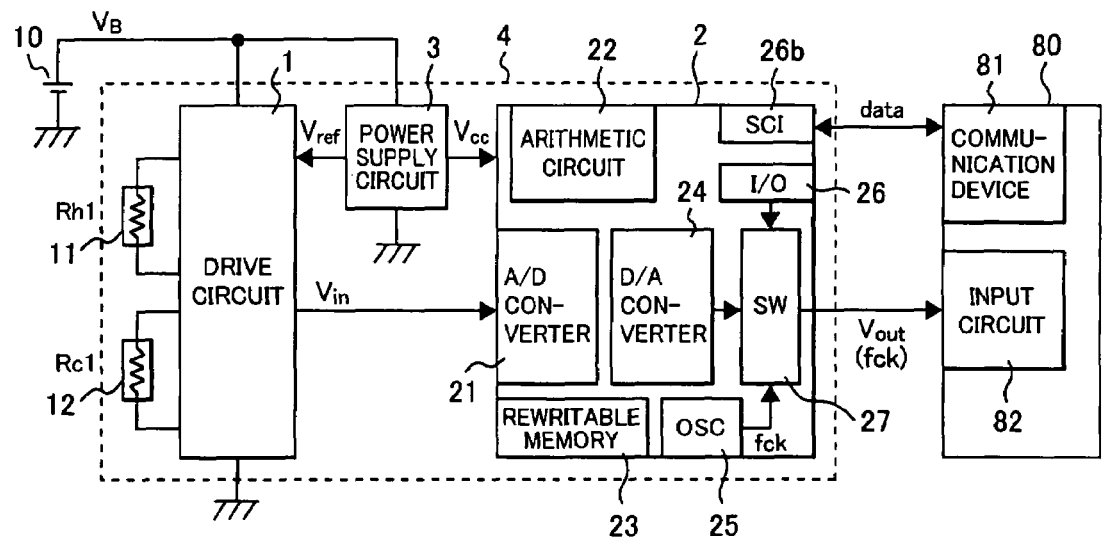
FIG. 20 is a system configuration diagram of a flow rate measurement apparatus relevant to a fifth embodiment of the invention.

FIG. 20 shows a configuration of the flow rate measurement apparatus relevant to the above-described embodiments, adapted to enable adjustment during production by external adjustment equipment 80.

The external adjustment equipment 80 is electrically linked to the digital processing device 2 to enable communication therewith in an adjustment stage during production of the flow rate measurement apparatus and performs an adjustment of the processing device 2, by using the output signal Vout from the digital processing device 2.

The external adjustment equipment 80 is able to change the operation mode of the digital processing device 2 and rewrite data on the rewritable memory 23 by communication, e.g., serial communication with the digital processing device 2. Specifically, an input circuit 82 of the external adjustment equipment is comprised of, e.g., an analog-digital converter, a frequency counter, and other components, and data necessary for adjustment is input from the digital processing device 2 through it. In the external adjustment equipment 80, an input signal is optimized to a predetermined characteristic or optimized according to a clock signal or the like, thus producing optimum adjustment data.

The produced adjustment data is transferred to a serial communication interface (SCI) 26b of the digital processing device 2 from a communication device 81 and an adjustment parameter 47 in the internal rewritable memory 23 is rewritten with the adjustment data.

Figure 21:
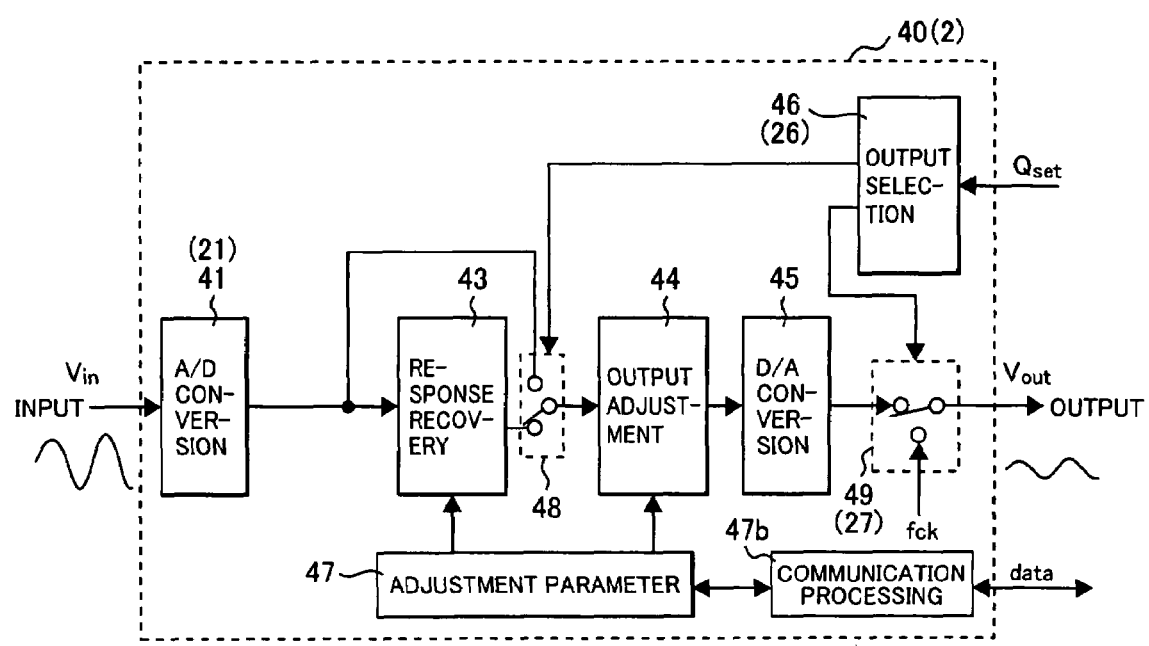
FIG. 21 is a block diagram of arithmetic processing which is performed by the digital processing device of the above flow rate measurement apparatus.

FIG. 21 illustrates detailed operation of the digital processing device 2. This represents the above-described software operation in the digital processing device 2. Signal data (data) sent by serial communication is interpreted by communication processing 47b and the adjustment parameter 47 is changed according to the data. The operations relating to the response recovery processing 43 are the same as described in the foregoing embodiments. In this embodiment, by reading the clock signal used for arithmetic processing 40 and optimizing the adjustment constant for response recovery appropriately for individual flow rate measurement apparatus 4, it is possible to optimize response variation.

Figure 22:
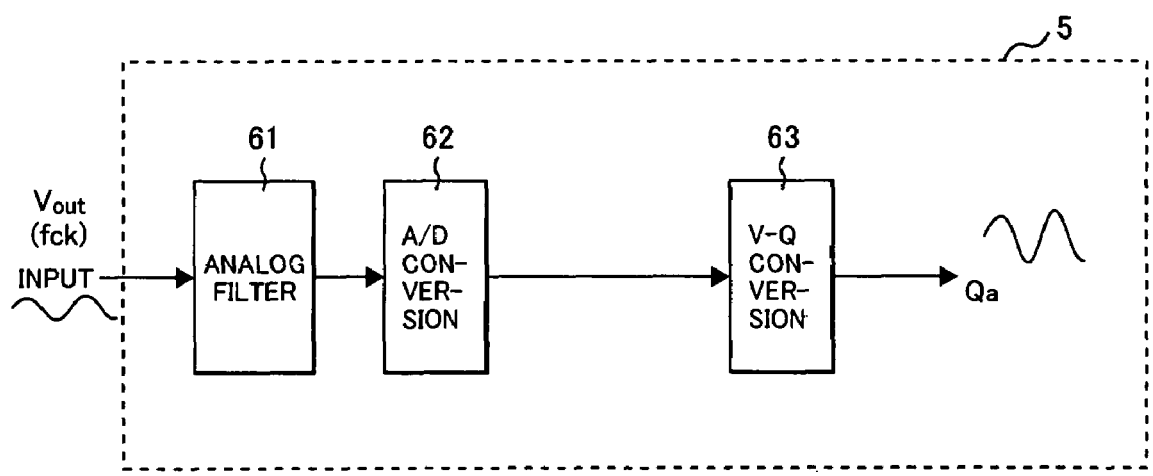
FIG. 22 is a block diagram illustrating digital processing in the engine control unit used in the above embodiment.

FIG. 22 illustrates another example of the engine controller 5 which is connected to the above flow rate measurement apparatus 2 after adjustment.

In this example, the response recovery processing 43 is performed in the digital processing device 2 of the sensor 3 as shown in FIG. 21 and the engine controller 5 is configured not to execute response recovery.

A determination processing for determining whether or not to execute response recovery processing (in other words, determining whether the engine runs in a high engine speed range where air intake pulsation is caused to occur) is made as follows.

A range where a backflow occurs can be predicted, based on mapping of a throttle opening versus an engine speed and the like (a range where the flow rate error amplitude increases is distinguished during an engine run when no correction is made). Additionally, if data on negative pressure (boost pressure) of the intake pipe is used, more accurate prediction can be performed.

In the present embodiment, whether or not to execute response recovery in the sensor 4 is determined or the parameter for response recovery is changed, based on such data (throttle opening, engine speed, negative pressure of the intake pipe, etc.) indicative of the engine state.

FIG. 22 illustrates processing in the engine controller 5.

In the controller of the present embodiment, simple processing is only required in which, after noise ejection by an analog filter 61, a digital voltage signal is obtained by normal analog-digital conversion processing 62 and converted into a flow rate by V-Q conversion processing 63. According to the present invention, well-reproducible delay rectification is achieved and a system merit can be provided to a certain level of effect, while special processing is not required in the engine controller.

INDUSTRIAL APPLICABILITY

According to the above embodiments, even in a case where pulsation errors change due to change to the engine and the air intake system, a reduction in the pulsation errors can be achieved easily without significantly changing the characteristics of the air intake system and the sensor itself. In consequence, such an advantage can be obtained that the term of development of the air intake system of an engine, its measurement system, etc. can be reduced considerably.

In each of the embodiments described hereinbefore, in engine control application, by decreasing measurement errors during pulsation or transient response, more accurate control can be performed and effects such as reduced exhaust gas and improved fuel consumption are obtained.

The flow rate meter according to the foregoing embodiments can produce the same effects when it is used to detect a flow of hydrogen gas of fuel cells and the like.

What is claimed is:

1. A thermal type flow rate measurement apparatus comprising a flow rate sensing element for sensing a flow rate of a fluid and capable of also sensing a forward flow and a backflow of a pulsating flow in said fluid, characterized by comprising:
    a response recovery means for recovering a response delay of an output signal from said flow rate sensing element; and
    a means for determining whether or not to execute a response recovery for said output signal or changing a parameter value for said response recovery, in accordance with a determination as to whether a backflow occurs or an estimated amount of said backflow.

2. The thermal type flow rate measurement apparatus according to claim 1, wherein the apparatus makes a flow rate signal to be determined whether said backflow occurs, based on said output signal, performs said response recovery to said flow rate signal, and determines whether said backflow occurs or calculates the estimated amount of said backflow from at least said flow rate signal processed by said response recovery.

3. The thermal type flow rate measurement apparatus according to claim 1, wherein the apparatus uses a correlation value obtained from a maximum value and a minimum value in a pulsation of said flow rate signal processed by said response recovery to determine whether said backflow occurs.

4. The thermal type flow rate measurement apparatus according to claim 1, wherein said determination as to whether said backflow occurs or the estimated amount of said backflow is determined by extracting the output signal characteristics of said flow rate sensing element.

5. The thermal type flow rate measurement apparatus according to claim 1, further comprising:
    a first output means for outputting the output signal of said flow rate sensing element, not processed by the response recovery;
    a second output means for outputting the output signal of said flow rate sensing element, processed by the response recovery; and
    a flow rate signal selecting means for selecting the output signal not processed by the response recovery, when a detection value of said backflow is not included in a pulsation of a flow rate signal based on the output signal of said flow rate sensing element, and selecting an output signal processed by the response recovery, when a said detection value of a said backflow is included in the pulsation of said flow rate signal.

6. The thermal type flow rate measurement apparatus according to claim 1, wherein said thermal type flow rate measurement apparatus is used to measure a flow rate of intake air of an internal combustion engine and determines whether said backflow occurs, by using at least throttle opening of the engine and the engine speed.

7. The thermal type flow rate measurement apparatus according to claim 1, wherein said thermal type flow rate measurement apparatus is used to measure a flow rate of intake air of an internal combustion engine and uses a zero flow rate when the engine is stopped as a reference flow rate used for backflow determination.

8. The thermal type flow rate measurement apparatus according to claim 1, wherein said thermal type flow rate measurement apparatus is used to measure a flow rate of intake air of an internal combustion engine, and
    wherein said apparatus is comprised of: a flow rate sensor including said flow rate sensing element and a said response recovery means; and an engine controller including said means for determining whether or not to execute said response recovery or changing said parameter value for said response recovery.

9. The thermal type flow rate measurement apparatus according to claim 7, wherein said engine controller determines the pulsation state of the output signal of said flow rate sensing element from whether the backflow occurs or the estimated amount of the backflow and uses a plurality of output voltage to flow rate conversion tables for determining the pulsation level.

10. The thermal type flow rate measurement apparatus according to claim 1, wherein the output signal from said flow rate sensing element is converted into a digital signal; said response recovery is performed on the digital signal; and the apparatus further comprises a parameter adjustment means for automatically adjusting the parameter value for said response recovery, in accordance with variations or error in a clock signal which is used in the response recovery.

11. A thermal type flow rate measurement apparatus comprising a flow rate sensing element for sensing a flow rate of a fluid and capable of also sensing a forward flow and a backflow of a pulsating flow, characterized by comprising:
    a response recovery means for recovering a response delay of an output signal from said flow rate sensing element; and
    at least one of a means for determining whether or not to execute said response recovery in accordance with at least engine speed and a means for changing a parameter value for response recovery in accordance with at least engine speed.

12. The thermal type flow rate measurement apparatus according to claim 1, wherein said flow rate sensing element and said response recovery means are formed integrally on a silicon substrate.

13. The thermal type flow rate measurement apparatus according to claim 11, wherein said means for determining whether or not to execute said response recovery is configured to select said output signal processed by said response recovery means at the time when an engine of an internal combustion is in a high engine speed range and select said output signal not processed by said response recovery means at the time when said engine is in a low engine speed range.

14. The thermal type flow rate measurement apparatus according to claim 11, wherein said means for changing said parameter value for said response recovery is configured to change said parameter value in accordance with a high engine speed range and a low engine speed range.

15. The thermal type flow rate measurement apparatus according to claim 11,
wherein said means for determining whether or not to execute said response recovery is configured to select said output signal processed by said response recovery means at the time when an engine of an internal combustion is in a high engine speed range and select said output signal not processed by said response recovery means at the time when said engine is in a low engine speed range; and
wherein said means for changing said parameter value for said response recovery is configured to change said parameter value in accordance with said high engine speed range and said low engine speed range.

* * * * *